United States Patent [19]
Gardiner

[11] 3,866,669
[45] Feb. 18, 1975

[54] EXTRUDER AND TEMPERATURE CONTROL APPARATUS THEREFOR

[75] Inventor: Robert A. Gardiner, Westerly, R.I.

[73] Assignee: Crompton & Knowles Corporation, New York, N.Y.

[22] Filed: Nov. 29, 1973

[21] Appl. No.: 420,129

Related U.S. Application Data
[63] Continuation of Ser. No. 314,887, Dec. 13, 1972, abandoned.

[52] U.S. Cl. .................. 165/27, 165/168, 259/191, 425/143
[51] Int. Cl. ............................................ F28f 27/02
[58] Field of Search ................ 165/27, 30, 168, 14; 425/378, 379, 143, 144; 219/390; 259/191, DIG. 18

[56] References Cited
UNITED STATES PATENTS

| | | | |
|---|---|---|---|
| 2,549,569 | 4/1951 | Bradley | 165/14 |
| 2,721,729 | 10/1955 | Van Riper | 165/168 X |
| 2,832,879 | 4/1958 | Van Riper | 165/27 X |
| 3,143,167 | 8/1964 | Vieth | 165/27 |
| 3,317,958 | 5/1967 | Stroup et al. | 259/191 X |
| 3,369,594 | 2/1968 | Farrell | 165/14 |
| 3,751,014 | 8/1973 | Waterloo | 165/30 X |

*Primary Examiner*—Manuel A. Antonakas

[57] ABSTRACT

An extruder having a barrel and apparatus for maintaining the extruder barrel at constant temperature which includes a shell surrounding the barrel; means for heating the shell; means for cooling the shell; at least two current providing temperature probes, one within the shell and one within the barrel and a control unit for combining currents from both probes to selectively activate the heating and cooling means. The shell is made of a material which has a higher thermal conductivity or thermal diffusivity than the barrel material and the shell has a total heat capacity of between 0.5 and 1.5 times that of the barrel.

8 Claims, 3 Drawing Figures

3,866,669

EXTRUDER AND TEMPERATURE CONTROL APPARATUS THEREFOR

This application is a continuation of my co-pending application Ser. No. 314,887, filed Dec. 13, 1972 entitled "Temperature Control Apparatus for Extruders", and now abandoned.

BACKGROUND OF THE INVENTION

This invention relates to apparatus for controlling the temperature of an extruder barrel so that the operating temperature of the barrel is maintained within desired limits.

In order to produce high quality extruder products with consistency, particularly in extruding plastic material, the desired barrel temperature must be maintained with minimum variations in temperature. The degree to which the temperature must be maintained constant depends upon the material to be extruded. Temperature variation, depending upon degree, results in rate changes, quality changes, degradation of polymer, loss of feed, as well as other forms of instability to the steady state process.

Prior art temperature control systems have utilized cooling and heating means controlled by temperature sensors to heat or cool the barrel depending on whether the sensor indicates a lower or higher barrel temperature than the desired temperature.

Although the prior art devices are effective to modify the barrel temperature to reach a desired value, they have been unable to prevent fluctuations around the desired temperature for typical variable extruder conditions. Examples of prior art systems are shown in U.S. Pat. Nos. 2,508,988 and 3,263,741. The latter U.S. patent discloses means for cooling and heating an extruder barrel and a sensing probe for sensing the barrel temperature. In systems using this principle, the barrel temperature fluctuates between a high point and a low point although the average temperature over a period of time may approximate the optimum temperature. The fluctuations in temperature are due to time lags between the probe and heating or cooling means. When the probe indicates a barrel temperature lower than the desired temperature, the heating means are activated. By the time that the barrel is heated sufficiently for the probe to indicate the desired barrel temperature to deactivate the heating means, additional heat will be transmitted to the barrel so that the probe then senses a temperature higher than the desired temperature. At this point the probe will activate the cooling means until the barrel temperature reaches the desired temperature. At this point, the cooling means will be deactivated but additional cooling will continue to take place and the barrel temperature will drop below the desired temperature to begin another heating cycle. Temperature plotted against time will resemble a series of sine waves.

U.S. Pat. No. 2,508,988 represents another example of a heat control system wherein heating and cooling means are used to modify the temperature of an extruder barrel. Two types of probes are employed, one of which senses the barrel temperature and is effective to activate the cooling means if the barrel temperature rises above the desired temperature. The heating means are electric heating strips located in the supporting member for transmitting heat through the supporting member to the extruder barrel. The second type of probe is located in the supporting member for sensing the temperature therein and for controlling the flow of current to the heating units to regulate the temperature of the supporting member. A major drawback of this type of system is the inability to regulate the barrel temperature if the barrel becomes excessively hot. This condition occurs if heat is generated in the barrel when certain types of materials are being extruded. This heat is typically produced by friction of the material as it is being "worked" in the barrel. When this condition exists, the probe which senses barrel temperature will activate the cooling means which begins to cool the supporting member. Before heat from the excessively hot extruder barrel can be drawn from the cooled supporting member, the probes within the supporting member will sense the lower temperature of the supporting member and cause the heating coils to generate more heat. The result of this is that heating and cooling may occur simultaneously and the barrel may never be cooled to the desired temperature.

SUMMARY OF THE INVENTION

It is a principal object of the invention to provide a temperature control system for extruder barrels wherein the barrel temperature is maintained at a desired temperature without significant variations or fluctuations from the desired temperature.

The object of the invention is accomplished by providing a shell having cooling and heating means around the barrel and by making the shell of a material which has a higher thermal conductivity or thermal diffusivity than the barrel material and by providing a shell which has a total thermal capacity of between 0.5 and 1.5 times that of the barrel. This results in relatively wider temperature fluctuations for the jacket but narrower temperature fluctuations for the barrel since cooling or heating can be applied more quickly to the shell but the barrel itself changes temperature more slowly. Two probes are used, one for sensing the barrel temperature and one for sensing the shell temperature. Both probes are tied into a control unit which utilizes the thermal effects of both probes to actuate the heating means if the combined temperatures sensed by both probes are below a preset value and to actuate the cooling means if the combined temperatures sensed by both probes are above a preset value. By utilizing the thermal effects on both probes, fluctuations in barrel temperature are eliminated. If, for example, one probe senses a low barrel temperature and the other probe senses a high shell temperature, no additional heat will be provided and the barrel will soon achieve the desired temperature because heat will flow from the shell to the barrel. If, on the other hand, the first probe senses a high barrel temperature and the second probe senses a low jacket temperature no cooling will take place and heat will be quickly drawn from the barrel to the jacket to reduce the barrel temperature to the desired value. These last two examples represent instances where the temperatures sensed by both probes average out to the desired barrel temperature. If the average of both probes are higher or lower than the desired barrel temperature then cooling or heating will take place to bring the system into balance again. By using two probes tied into a central control unit the time delay due to thermal conductivity is eliminated. The probe near the barrel liner senses barrel temperature, the probe within the jacket senses the shell temperature, while the combination of the two probes anticipates whether more heat will be needed or whether dissipation of heat will be required.

The invention also provides means for giving more weight to the barrel temperature. This is particularly useful for extreme thermal load conditions where there is a greater discrepancy between shell and barrel temperatures. By giving more weight to the barrel temperature the measured barrel temperature will more closely approximate the preset value of the control unit.

DETAILED DESCRIPTION

Figure 1:
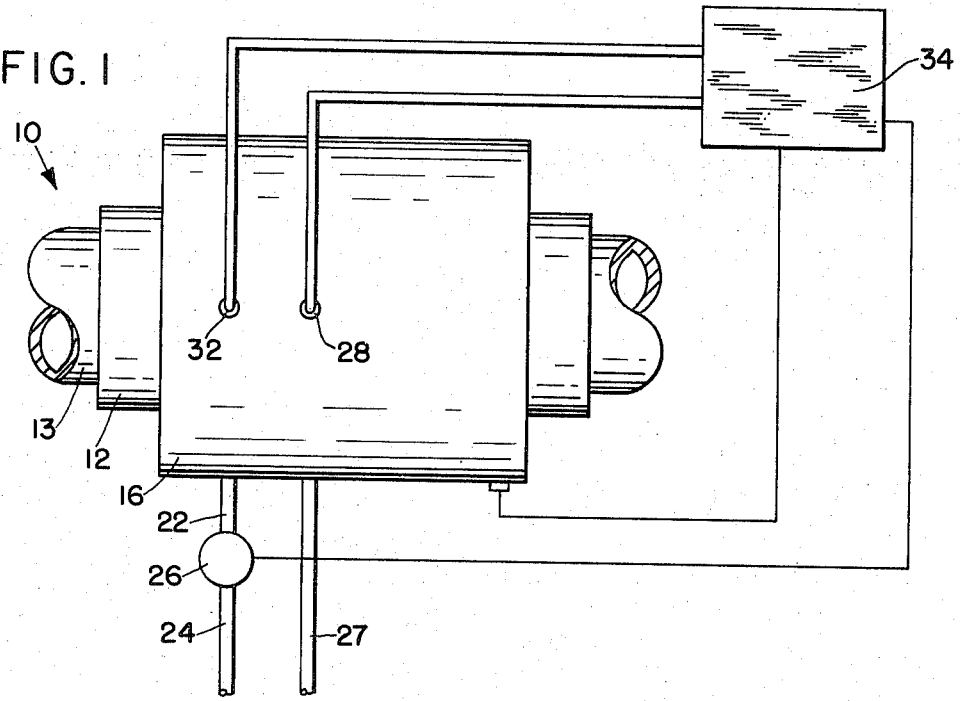
FIG. 1 is a plan view of the invention as applied to an extruder barrel.
Figure 2:
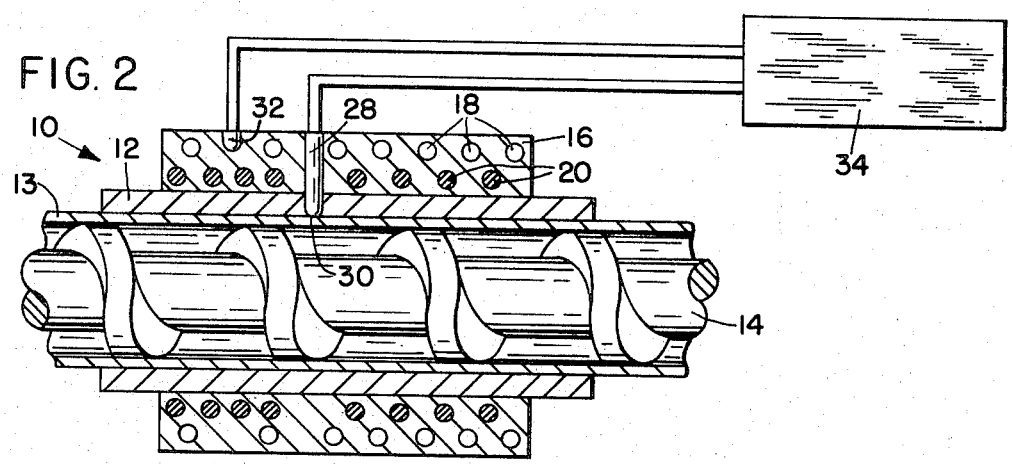
FIG. 2 is longitudinal section along the barrel axis and showing the locations of the temperature probes.

Referring to the drawings, the temperature control apparatus of the present invention is indicated generally by the reference numeral 10 and is shown applied to an extruder barrel 12 and liner 13. Material to be extruded is advanced along the length of the barrel 12 by a screw 14 in a well-known manner.

Temperature control apparatus 10 includes a shell 16 which surrounds the barrel 12. Shell 16 contains a cooling tube 18 and an electrical heating element 20 which are both arranged in serpentine fashion within the shell. The cooling tube may be helically disposed within the shell as shown, for example, in U.S. Pat. No. 3,263,741. Other types of cooling means may be used such as, for example, the air cooling means shown in U.S. Pat. No. 3,353,212.

In the embodiment shown in the present application, cooling fluid enters shell 16 from an intake pipe 22 which is connected to a supply pipe 24 through a solenoid valve 26. The cooling fluid in pipe 24 can be water under normal "street" pressure or any other fluid from an internal reservoir system which may be supplied by pumping means. When solenoid valve 26 is operated to connect intake pipe 22 to supply pipe 24, cooling fluid under pressure is circulated through tube 18 and exits from the shell through an exit pipe 27.

Shell 16 is constructed of a material which has a relatively high heat conduction value such as aluminum and the barrel 12 and liner 13 are constructed of a material having a relatively low heat conduction value such as steel.

The difference in material between the shell 16 and barrel 12 can also be expressed in terms of "thermal diffusivity" which is a function of "thermal conductivity" and is defined as:

$K/P\ Cp$, where

K = thermal conductivity of the material in BTU/(HR)(ft.)(F°)

P = density of the material in No./ft$^3$

Cp = specific heat of the material in BTU/No.

After factoring, "thermal diffusivity" is expressed as: ft$^2$/hr.

For maximum effectiveness, it is preferred that the "thermal diffusivity" of the shell material be at least twice that of the barrel material. For example, calculated "thermal diffusivity" values for aluminum and steel are 1.56 ft$^2$/hr. and 0.624 ft$^2$/hr. respectively.

The difference in the "total heat capacity" between the shell and barrel is also essential. "Total heat capacity" is a product of the specific heat of the material and weight and is expressed as BTU/F°. It is preferred that the "total heat capacity" of the shell should not be less than 0.5 or more than 1.5 times that of the barrel. If the "total heat capacity" of the shell is less than 0.5 of that of the barrel, the heat exchange operation will not be as economical as well as having slow response for heat flow to and away from the barrel. If the "total heat capacity" of the shell is greater than 1.5 of that of the barrel, the temperature control system will not be as stable. There will be a tendency to maintain the shell temperature stable and to vary the barrel temperature which is just the reverse of what is desired to be accomplished.

Temperature control apparatus 10 also includes a first temperature probe 28 which extends through the shell 16 and has a temperature sensitive tip 30 embedded into the extruder barrel for sensing the temperature of the barrel. A second probe 32 extends into the shell 16 for sensing the temperature of the shell.

Probes 28 and 32 may be of any type which provide electrical currents which are proportionate to the temperature of the probe and are electrically connected to the temperature control unit 34. Any commercially available temperature control unit could be used, providing that it is capable of utilizing an electrical current such as that provided by a temperature probe to control other electrical devices such as the heating elements 20 or valve 26. A thermocouple is one example of a temperature probe which may be used. Unit 34 must be capable of averaging the current from both probes and selectively operating either the heating element 20 or valve 26. Most control units have an adjustable "set point" or preset value to which the averaged currents are compared. If the averaged currents are above the "set point," valve 26 will be activated and if the averaged currents are below the "set point," the heating element 20 unit will be activated.

Figure 3:
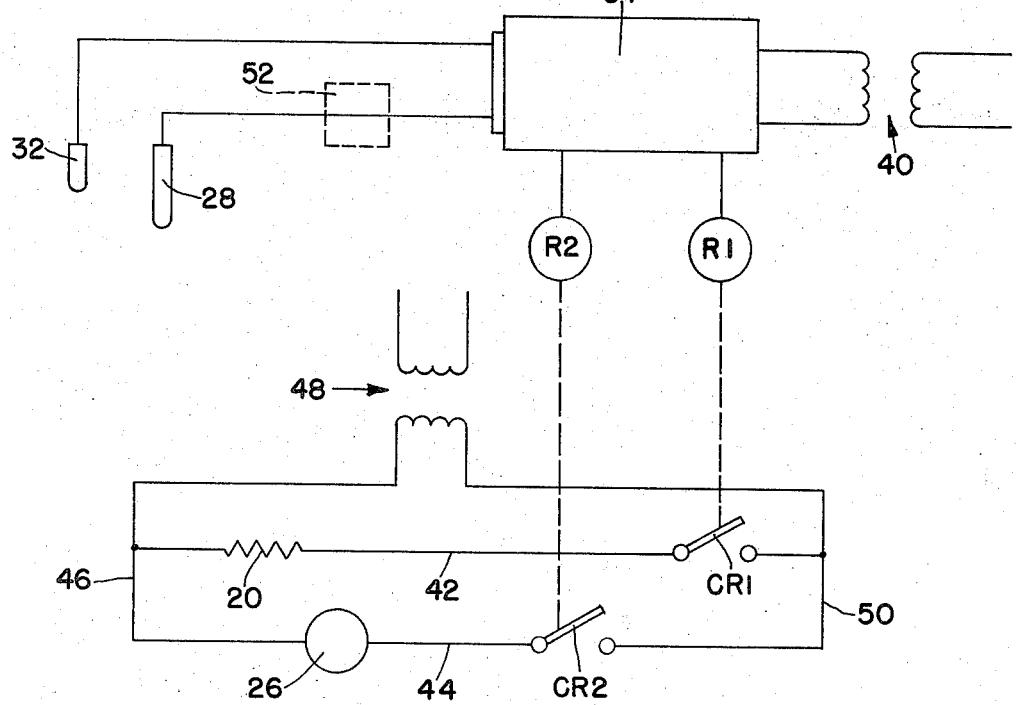
FIG. 3 is a diagramatic view of the temperature control circuitry.

FIG. 3 illustrates diagramatically how the control unit 34 may be used to control heating element 20 and valve 26. Unit 34 is connected to a low power source indicated generally at 40. Heating element 20 and valve 26 are located on lines 42 and 44 respectively which are connected to a power line 46 from a source of high voltage generally indicated at 48. Unit 34 includes a pair of relays R1 and R2 which have contacts CR1 and CR2 respectively on lines 42 and 44 respectively. When the currents from probes 28 and 32 average below the "set point" in unit 34, relay R1 is energized and its contact CR1 is closed to connect line 42 to a power line 50 from the other side of high voltage source 48 and activate heating element 20 to add heat to the jacket 16. When the currents from probes 28 and 32 average above the "set point" in unit 34, relay R2 will be energized and its contact CR2 closed to connect line 44 to power line 50. This completes a circuit across line 44 and activates solenoid valve 26 to connect pipe 22 to supply pipe 24 and circulate cooling fluid through shell 16 to cool the shell.

It is preferred that changes in barrel temperature be given more weight than comparable changes in jacket temperature. This can be done electrically by varying the amplification the current provided by probe 28 to a greater extent than the current provided by probe 32; by using different probes whereby the probe in the barrel provides a greater current per degree than the probe in the jacket or by increasing the number of probes in the barrel. The means for amplifying the current from probe 28 can be accomplished by circuitry within the control unit 34 or by placing amplifying means between probe 28 and control unit 34 as indicated by dotted lines 52 in FIG. 3.

I claim:

1. An extruder having an extruder barrel and temperature control apparatus comprising:
   a. a shell surrounding at least a portion of an extruder barrel, said shell being made of a material having a substantially higher thermal conductivity than said barrel, said shell having a total heat capacity of between 0.5 and 1.5 times that of said barrel portion;
   b. means for cooling said shell;
   c. means for heating said shell;
   d. a first temperature probe set into said extruder barrel for sensing the temperature of said barrel and providing a proportional current;
   e. a second temperature probe set into said shell for sensing the temperature of said shell and providing a proportional electrical current;
   f. an electrical temperature control unit connected to said first and second probes and effective to selectively activate said heating and cooling means in response to the electrical currents from said first and second probes; and
   g. means for weighting the temperature probe current from said barrel to a greater extent than the temperature probe current from said shell.

2. The extruder as set forth in claim 1 wherein said weighting means comprises one or more additional probes in said barrel for producing an additional current to be combined with the current from said first temperature probe.

3. The extruder as set forth in claim 1 wherein said weighting means comprises means to electrically amplify the current from said first probe with respect to the current from said second probe.

4. The extruder as set forth in claim 1 wherein said weighting means comprises the employment of different types of temperature probes wherein said first probe provides a stronger current than said second probe for the same temperature.

5. An extruder having an extruder barrel and temperature control apparatus comprising:
   a. a shell surrounding at least a portion of an extruder barrel, said shell being made of a material having a substantially higher thermal diffusivity than said barrel, said shell having a total heat capacity of between 0.5 and 1.5 times that of said barrel portion;
   b. means for cooling said shell;
   c. means for heating said shell;
   d. a first temperature probe set into said extruder barrel for sensing the temperature of said barrel and providing a proportional electrical current;
   e. a second temperature probe set into said shell for sensing the temperature of said shell and providing a proportional electrical current;
   f. an electrical temperature control unit connected to said first and second probes effective to selectively activate said heating and cooling means in response to the electrical currents from said first and second probes; and
   g. means for weighting the temperature probe current from said barrel to a greater extent than the temperature probe current from said shell.

6. The extruder as set forth in claim 5 wherein said weighting means comprises one or more additional probes in said barrel for producing an additional current to be combined with the current from said first temperature probe.

7. The extruder as set forth in claim 5 wherein said weighting means comprises means to electrically amplify the current from said probe with respect to the current from said second probe.

8. The extruder as set forth in claim 5 wherein said weighting means comprises the employment of different types of temperature probes wherein said first probe provides a stronger current than said second probe for the same temperature.

* * * * *